US012652507B2

(12) United States Patent
Sagano et al.

(10) Patent No.: US 12,652,507 B2
(45) Date of Patent: Jun. 9, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Masayuki Sagano, Tokyo (JP); Hiromi Fukaya, Tokyo (JP); Shuhei Miyazaki, Tokyo (JP); Kanna Tominaga, Tokyo (JP); Takeshi Matsui, Tokyo (JP)

(73) Assignee: Sony Group Corporation, Tokyo (JP)

( * ) Notice: Subject to any disclaimer, the term of this patent is extended or adjusted under 35 U.S.C. 154(b) by 165 days.

(21) Appl. No.: 18/683,542

(22) PCT Filed: Mar. 3, 2022

(86) PCT No.: PCT/JP2022/009107
§ 371 (c)(1),
(2) Date: Feb. 14, 2024

(87) PCT Pub. No.: WO2023/032266
PCT Pub. Date: Mar. 9, 2023

(65) Prior Publication Data
US 2024/0357303 A1     Oct. 24, 2024

(30) Foreign Application Priority Data

Sep. 3, 2021    (JP) ................................. 2021-144271

(51) Int. Cl.
*H04S 7/00*          (2006.01)
*G06Q 10/02*        (2012.01)
*H04N 21/2187*    (2011.01)
*H04N 21/4788*    (2011.01)

(52) U.S. Cl.
CPC ........... *H04S 7/30* (2013.01); *H04N 21/2187* (2013.01); *H04N 21/4788* (2013.01); *H04S 2400/11* (2013.01)

(58) Field of Classification Search
CPC ... H04S 7/30; H04S 2400/11; H04N 21/2187; H04N 21/4788; G06Q 10/02
USPC ..................................... 381/310, 1, 300, 309
See application file for complete search history.

(56) References Cited

U.S. PATENT DOCUMENTS

| | | | |
|---|---|---|---|
| 8,588,432 B1 | 11/2013 | Simon | |
| 10,687,145 B1 | 6/2020 | Campbell | |
| 2003/0142842 A1* | 7/2003 | Arai .......................... | H04R 5/02 |
| | | | 381/74 |
| 2011/0025916 A1* | 2/2011 | Kohara ..................... | H04S 7/30 |
| | | | 348/563 |
| 2019/0102941 A1* | 4/2019 | Khan ....................... | A63F 13/86 |
| 2019/0262705 A1 | 8/2019 | Trombetta | |
| 2020/0112813 A1 | 4/2020 | Sanger | |

FOREIGN PATENT DOCUMENTS

WO        2016/039156 A1      3/2016

OTHER PUBLICATIONS

International Search Report and Written Opinion mailed on May 17, 2022, received for PCT Application PCT/JP2022/009107, filed on Mar. 3, 2022, 8 pages including English Translation.

* cited by examiner

*Primary Examiner* — Thjuan K Addy
(74) *Attorney, Agent, or Firm* — XSENSUS LLP

(57) ABSTRACT
An information processing apparatus includes a processor. The processor reproduces a sound field generated in a purchased seat of a ticket purchaser.

19 Claims, 9 Drawing Sheets

Figure 2:
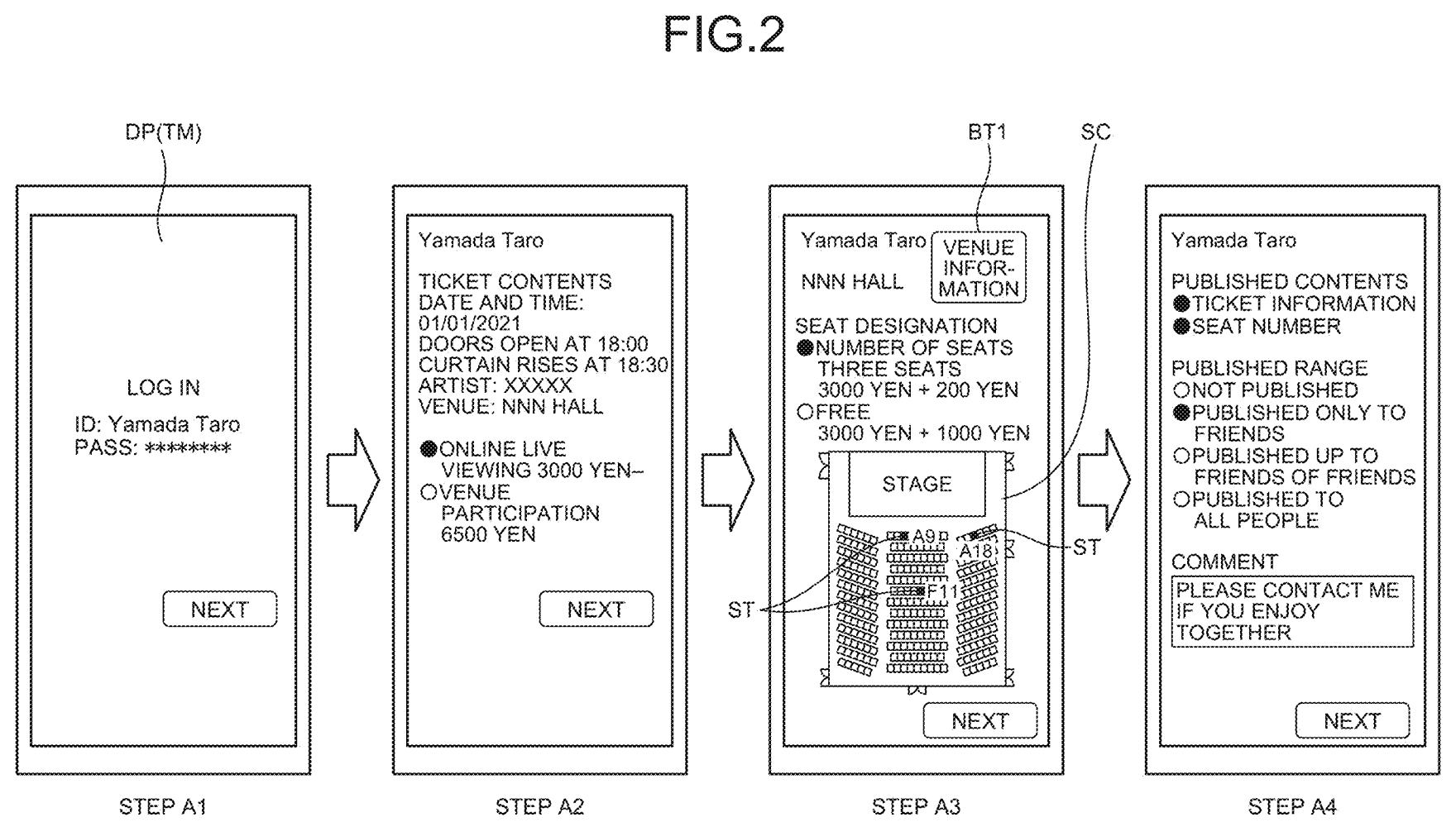

STEP A1

LOG IN

ID: Yamada Taro
PASS: ******

NEXT

STEP A2

Yamada Taro

TICKET CONTENTS
DATE AND TIME:
01/01/2021
DOORS OPEN AT 18:00
CURTAIN RISES AT 18:30
ARTIST: XXXXX
VENUE: NNN HALL

● ONLINE LIVE
VIEWING 3000 YEN–
○ VENUE
PARTICIPATION
6500 YEN

NEXT

STEP A3

BT1

Yamada Taro

NNN HALL        VENUE
                INFOR-
                MATION

SEAT DESIGNATION
● NUMBER OF SEATS
THREE SEATS
3000 YEN + 200 YEN
○ FREE
3000 YEN + 1000 YEN

SC

STAGE

A9p
A18

ST
ST

NEXT

STEP A4

Yamada Taro

PUBLISHED CONTENTS
● TICKET INFORMATION
● ● SEAT NUMBER

PUBLISHED RANGE
○ NOT PUBLISHED
● ● PUBLISHED ONLY TO
FRIENDS
○ PUBLISHED UP TO
FRIENDS OF FRIENDS
○ PUBLISHED TO
ALL PEOPLE

COMMENT
PLEASE CONTACT ME
IF YOU ENJOY
TOGETHER

NEXT

STEP D1

STEP D2

STEP D3

FV(FD)

FV

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2022/009107, filed Mar. 3, 2022, which claims priority from Japanese Patent Application No. 2021-144271, filed Sep. 3, 2021, the contents of each are incorporated herein by reference.

FIELD

The present invention relates to an information processing apparatus, an information processing method, and a program.

BACKGROUND

With the spread of the Internet, various pieces of content are distributed via a network. There has been recently provided service of distributing pieces of content of a concert, a stage, and a talk event online to a ticket purchaser.

CITATION LIST

Patent Literature

Patent Literature 1: WO 2016/039156 A

SUMMARY

Technical Problem

In conventional distribution service, a video and sound at a specific angle provided by an organizer are distributed as content. Therefore, it is not possible to obtain such realistic feeling that a ticket purchaser actually goes to a venue and performs viewing at a purchased seat.

Therefore, the present disclosure proposes an information processing apparatus, an information processing method, and a program capable of providing content with high realistic feeling.

Solution to Problem

According to the present disclosure, an information processing apparatus is provided that comprises a processor that reproduces a sound field generated in a purchased seat of a ticket purchaser. According to the present disclosure, an information processing method in which an information process of the information processing apparatus is executed by a computer, and a program for causing the computer to execute the information process of the information processing apparatus, are provided.

BRIEF DESCRIPTION OF DRAWINGS

FIG. 2 illustrates a ticket purchase procedure.

FIG. 4 is an explanatory diagram of a seat exchange request using chat.

FIG. 5 is an explanatory diagram of a simultaneous viewing request using chat.

DESCRIPTION OF EMBODIMENTS

An embodiment of the present disclosure will be described in detail below with reference to the drawings. In the following embodiment, the same reference signs are attached to the same parts to omit duplicate description.

Note that the description will be given in the following order.

[1. Content Distribution Service]
[2. Ticket Purchase]
[3. Seat Change Based on Venue Information]
[4. Seat Exchange Request Using Chat]
[5. Simultaneous Viewing Request Using Chat]
[6. Experience Example of Online Live Viewing]
[7. Virtual Cheer System]
[8. Remote Virtual Live System]
[9. Hardware Configuration Example]
[10. Effects]

1. Content Distribution Service

Figure 1:
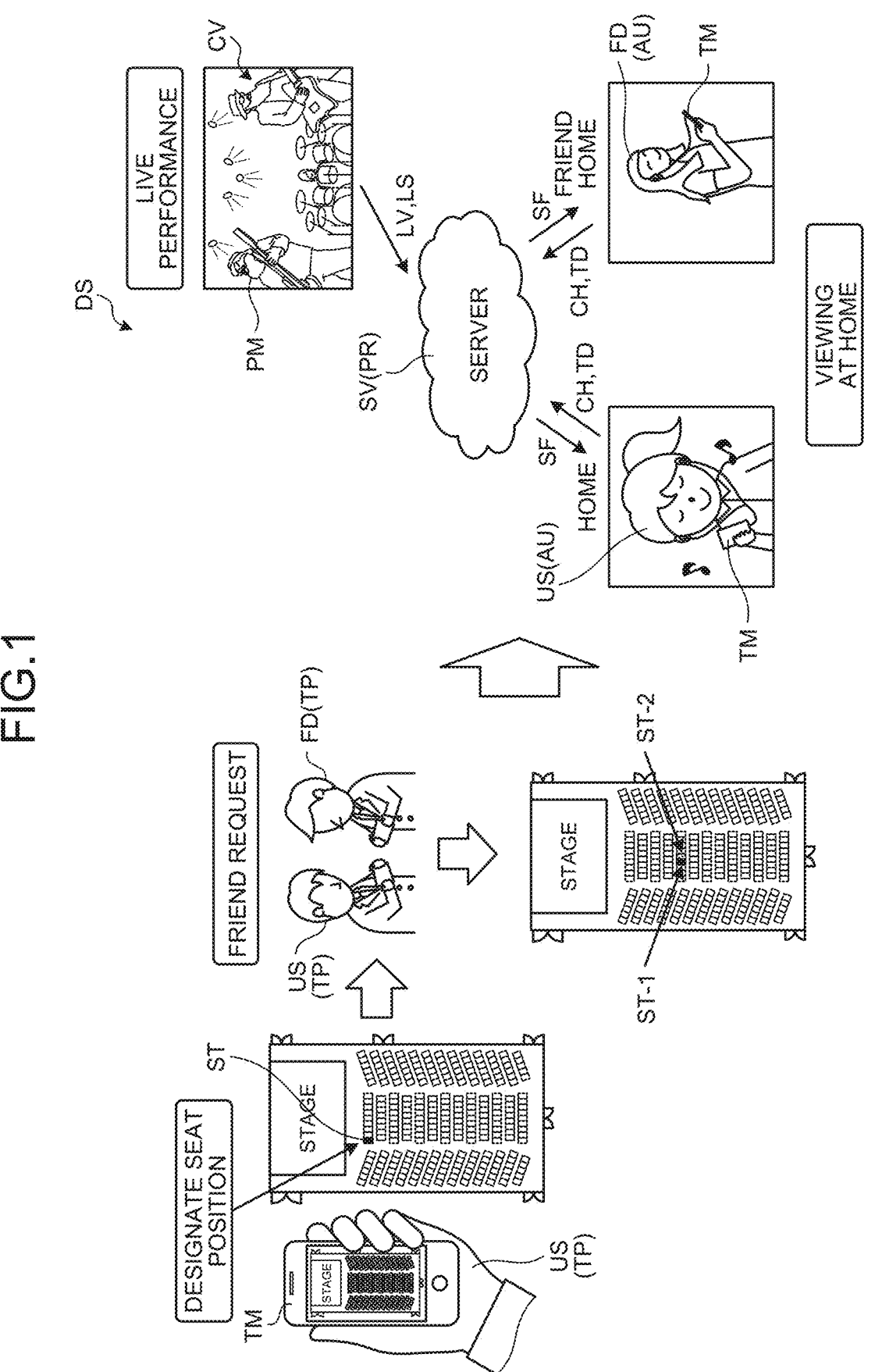
FIG. 1 illustrates one example of content distribution service.

FIG. 1 illustrates one example of a content distribution service DS.

In the content distribution service DS, content of a concert, a stage, and a talk event is distributed online to a ticket purchaser TP. Although content to be distributed may include both a live event and a past event, an example in which the live event is distributed will be described below. The content distribution service DS is implemented by an information processing system including a server SV and a terminal TM.

For example, a user US accesses a ticket purchase site by using the terminal TM such as a smartphone. The user US designates a seat position and purchases a ticket while referring to a seating chart SC of a venue CV of an event. The user US can make a friend request and register a friend FD in the server SV.

Figure 3:
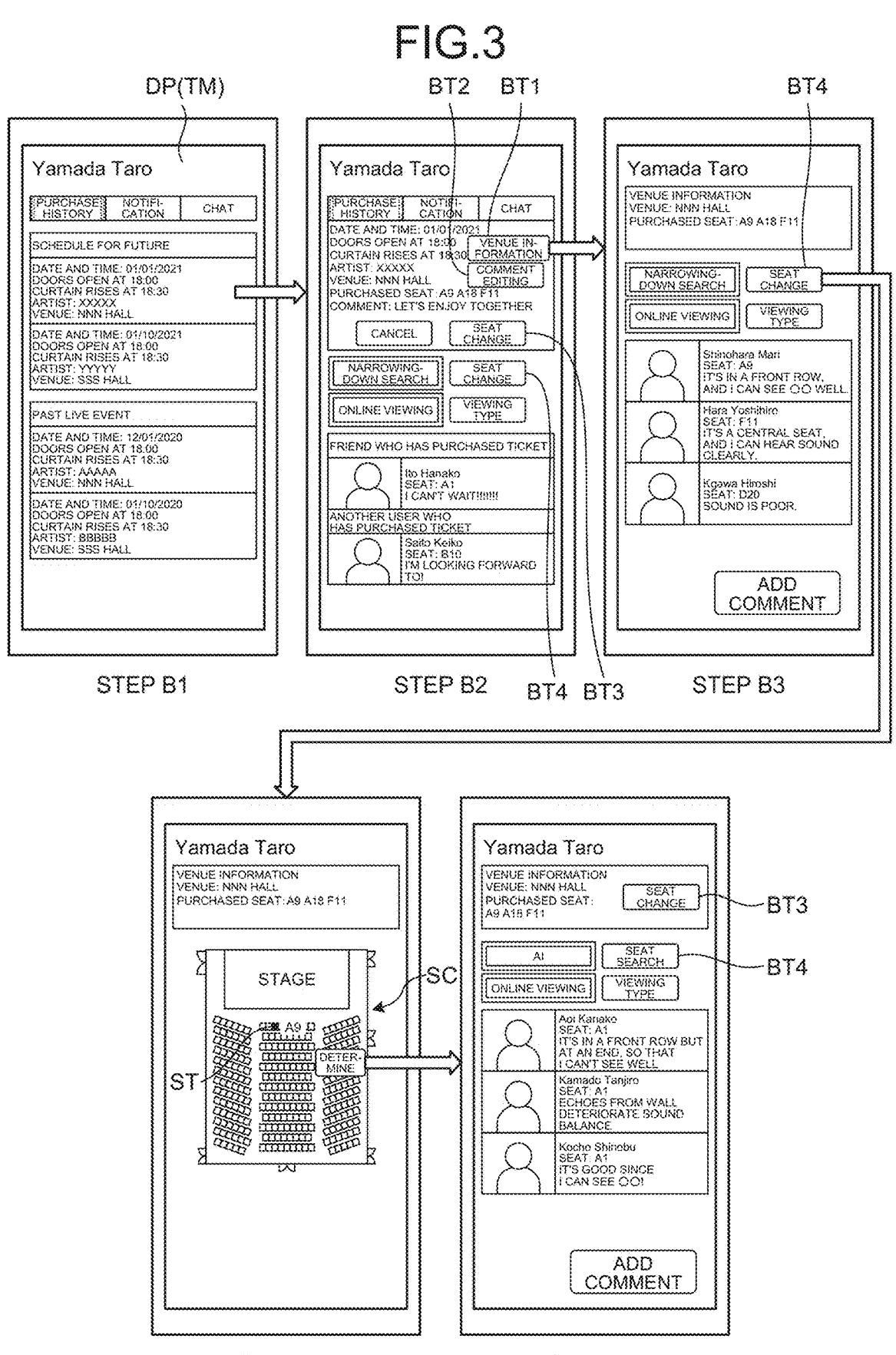
FIG. 3 illustrates seat change based on venue information.

The seat designated by the ticket purchaser TP (purchased seat ST) can be changed after purchase of the ticket by using a "seat change" button BT3 (see FIG. 3). For example, the ticket purchaser TP can change his/her seat ST-1 to a position close to a friend seat ST-2. This enables the ticket purchaser TP to enjoy a talk with the friend FD during the live event.

Information on the seat position (e.g., seat number) of the ticket purchaser TP is registered in the server SV as seat information. Live video data LV and live sound data LS of the venue CV are transmitted from a plurality of cameras and microphones installed in the venue CV to the server SV. When the ticket purchaser TP, who is a member of audience AU, cheers, sound data (cheer data CH) indicating the cheer is transmitted from the terminal TM of a ticket purchaser TM to the server SV. When the ticket purchaser TP talks with the friend FD, sound data (talk data TD) indicating the talk is transmitted from the terminal TM of the ticket purchaser TM to the server SV.

The server SV generates a video and sound to be viewed at the seat position of the ticket purchaser TP by using various pieces of data received from the venue CV and the terminal TM. Volume is set based on the distance between a performer PM (stage) serving as a sound source and the friend FD and the audience. A processor PR performs information processing of the server SV.

For example, when the stage is on the right side as viewed from the purchased seat ST, a video of the stage viewed from the left side and performance sound in which the performance is heard from the right side are generated. The server SV generates sound data for stereoscopically reproducing a sound field of sound heard from the stage based on the positional relation between the purchased seat ST and the stage.

When the purchased seat ST of the friend FD is on the right side, sound of a talk is generated such that a talk of the friend FD is heard from the right side. The server SV generates sound data for stereoscopically reproducing a sound field of a talk heard from the friend seat based on the positional relation between the purchased seat ST and the friend seat.

When the audience AU cheers, sound of the cheer is generated such that the cheer is heard from the direction of the purchased seat ST (audience seat) of the audience AU. The server SV generates sound data for stereoscopically reproducing a sound field of a cheer heard from each audience seat based on the positional relation between the purchased seat ST and each audience seat.

The server SV generates distribution data SF by using the generated video and sound. The distribution data SF is associated with a seat. The server SV transmits the distribution data SF to the terminal TM of the ticket purchaser TP who has purchased the corresponding seat. The ticket purchaser TP can obtain high realistic feeling as if performing viewing at the venue CV by reproducing the distribution data SF acquired from the server SV.

2. Ticket Purchase

FIG. 2 illustrates a ticket purchase procedure.

The user US logs in to the ticket purchase site by operating a touch panel DP of the terminal TM (STEP A1). The user US checks the ticket contents. The user US selects whether to view a live performance online (online live viewing) or directly go to the venue and view the live performance (venue participation) (STEP A2). In the example of FIG. 2, the online live viewing is selected.

After selecting a viewing method, the user US designates the seat ST (STEP A3). In the example of FIG. 2, seats with seat numbers of "A9", "A18", and "F11" are designated. "Free" means that the user US can freely move to all seats and perform viewing. In a case of the online live viewing, the position of a seat on which viewing is performed is instantaneously switched by the operation of the terminal TM. Therefore, the user US can simultaneously purchase a plurality of seats.

A ticket purchase cost is changed depending on the number of seats to be purchased. As a lot of seats are purchased, the ticket purchase cost increases. The price of a ticket may be changed depending on the position of the seat. For example, specific seats may be popular since a video is larger and more easily viewed at seats closer to the stage or sound is more stereoscopically heard at the center of the venue CV. In that case, an operator can sell tickets of popular seats at a high price.

The operator can optionally determine whether one ticket is to be sold for one seat or a plurality of tickets is to be sold for one seat. Since the ticket purchaser TP views, at home, a video and sound to be viewed at a seat via the terminal TM, a plurality of people can share the same seat.

When a plurality of tickets is sold for one seat, a desired seat can be purchased without pay attention to a status of purchase of other people. This also contributes to an increase in ticket sales. It is also possible to simultaneously purchase a plurality of seats at different locations and enjoy viewing while moving between seats. When one ticket is sold for one seat, the above-described effects cannot be obtained, but a special feeling can be given to the ticket purchaser TP.

When a talk with the friend FD is desired, an additional fee can be paid. When voice of the user US himself/herself is desired to be included in the cheer of the venue, the additional fee can be also paid. Since the performer PM can hear the cheer, communication with the performer PM during stage banter may be possible. Note, however, that, when the operator desires cheers of a lot of members of audience, the price of a ticket of a purchaser who distributes a cheer can be lowered.

The user US can check venue information by tapping a "venue information" button BT1. The venue information includes various pieces of information on the venue (e.g., word-of-mouth information on venue). The user US can determine a seat to purchase while checking the venue information.

When ending designation of the seat, the user US sets a method of publishing the purchased ticket (STEP A4). For example, information to be published (published contents) includes ticket information (ticket contents and viewing method) and information of a seat number. A published range can be selected from four options of "not published", "published only to friends", "published up to friends of friends", and "published to all people". Publishing the purchased ticket may lead to new communication in which the friend FD who has seen the published contents purchase the same ticket or purchase an adjacent seat, for example. There may be provided a function of giving a notification that the friend FD who has made a friend request participates in the same event after the purchase of the ticket.

Note that a seat to be sold may be a virtual seat such as a seat at a high position and a backstage area, which do not exist in an actual venue CV. The operator can optionally determine the number of seats and the arrangement pattern of the seats. Furthermore, the ticket purchaser TP can select a preferred arrangement pattern of seats from a plurality of arrangement patterns of seats prepared by the operator.

3. Seat Change Based on Venue Information

FIG. 3 illustrates seat change based on venue information.

The user US logs in to a ticket purchase site, and checks a ticket purchase history (STEP B1). A list of purchased tickets is displayed on the touch panel DP of the terminal TM. The user US can check the venue CV of an event, the seat number of the purchased seat ST, and comments of other people who are to participate in the same event by tapping a ticket in the list (STEP B2). The comments of other people can be narrowed down based on seat search and a viewing type. The user US can create a comment by tapping a "comment editing" button BT2.

When a tapped ticket is a ticket for an event to be held, a "seat change" button BT3 is displayed below the display position of the seat number. The user US can change the purchased seat ST by using the "seat change" button BT3. For example, the user US taps the "venue information" button BT1, and displays comment information on a past event held in the same venue (STEP B3). The order of display of comments is determined based on the positional relation between seats of contributors of the comments and the seat of the user US. For example, when there is a contributor with the same seat number as the user US, a comment of the contributor with the same seat number is preferentially displayed.

The user US can narrow down the comments by using a "seat search" button BT4. For example, when the user US taps the "seat search" button BT4, the seating chart SC is displayed (STEP B4). The user US taps a seat, and designates the seat of a contributor. The server SV extracts a comment of the contributor of the designated seat, and transmits the comment to the terminal TM (STEP B5). In the example of FIG. 3, the comment of a contributor of a seat "A1" is selectively displayed. A contributed date may be displayed in the comment.

4. Seat Exchange Request Using Chat

Figure 4:
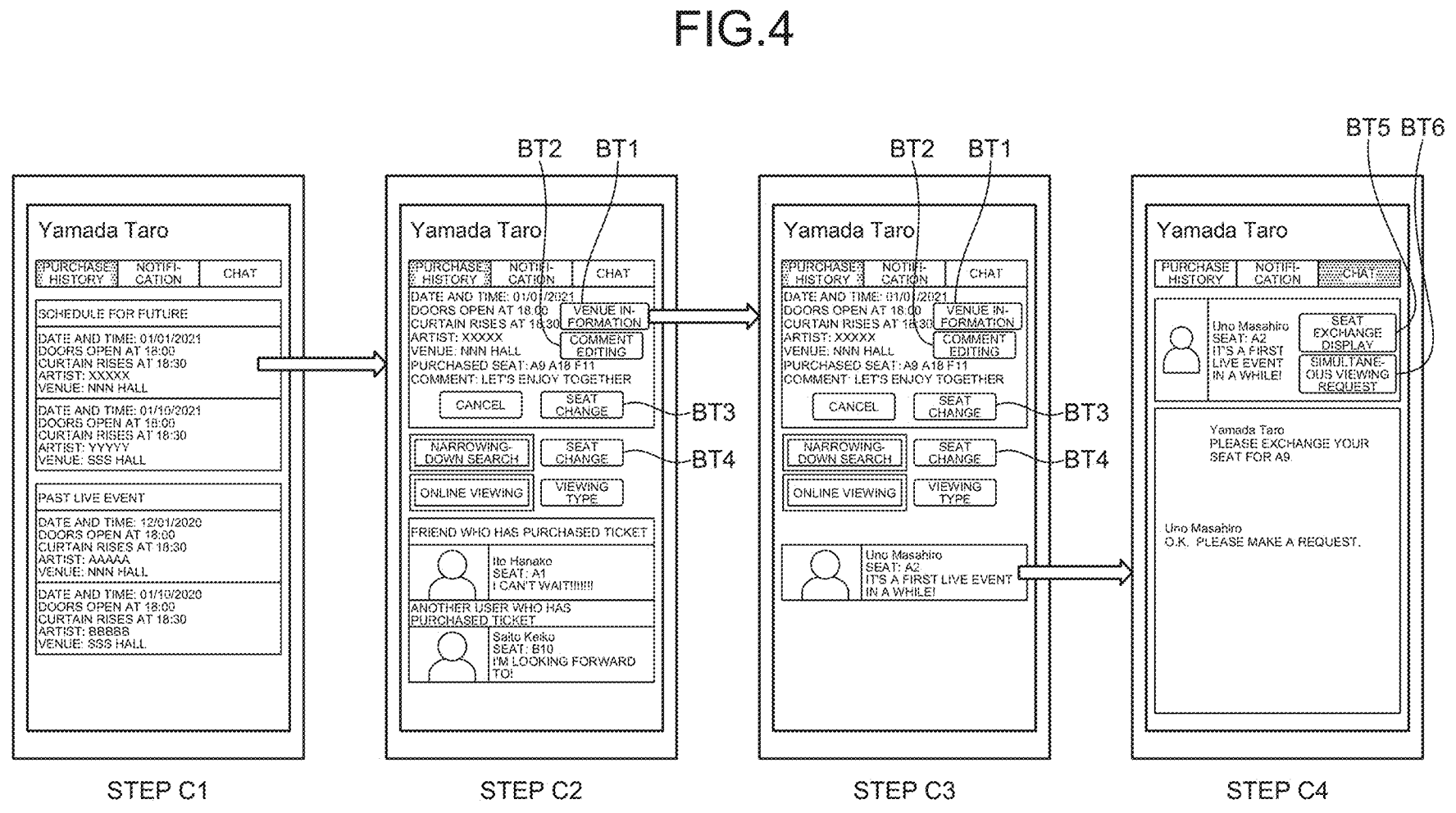

FIG. 4 is an explanatory diagram of a seat exchange request using chat.

The user US operates a screen of the ticket purchase history, and checks comments of other people on an event which the user US is to participate in (STEPS C1 to C2). The user US checks the participation status and the seat position of the friend FD based on the comment information.

When the user US desires a seat next to the friend FD, the user US checks the reservation status of the seat next to the friend FD. For example, the user US searches for a comment of a contributor of the seat next to the friend FD by using the "seat search" button BT4 (STEP C3). When a comment hits, it can be seen that the seat next to the friend FD has been purchased by this contributor. In the example of FIG. 4, the seat number of the friend FD is "A1". As a result of the user US searching for a comment of a contributor of the seat "A2", one comment hits.

When there is a comment of a contributor of the seat next to the friend FD, the user US makes a request of seat change to the contributor by using a chat function. For example, the user US taps the comment of the contributor to activate the chat function, and writes a request message for seat exchange in a reply field of the comment. When the contributor agrees to the request, the user US makes a request for exchange seats between the user US and the contributor by using a "seat exchange request" button BT5 (STEP C4).

5. Simultaneous Viewing Request Using Chat

Figure 5:
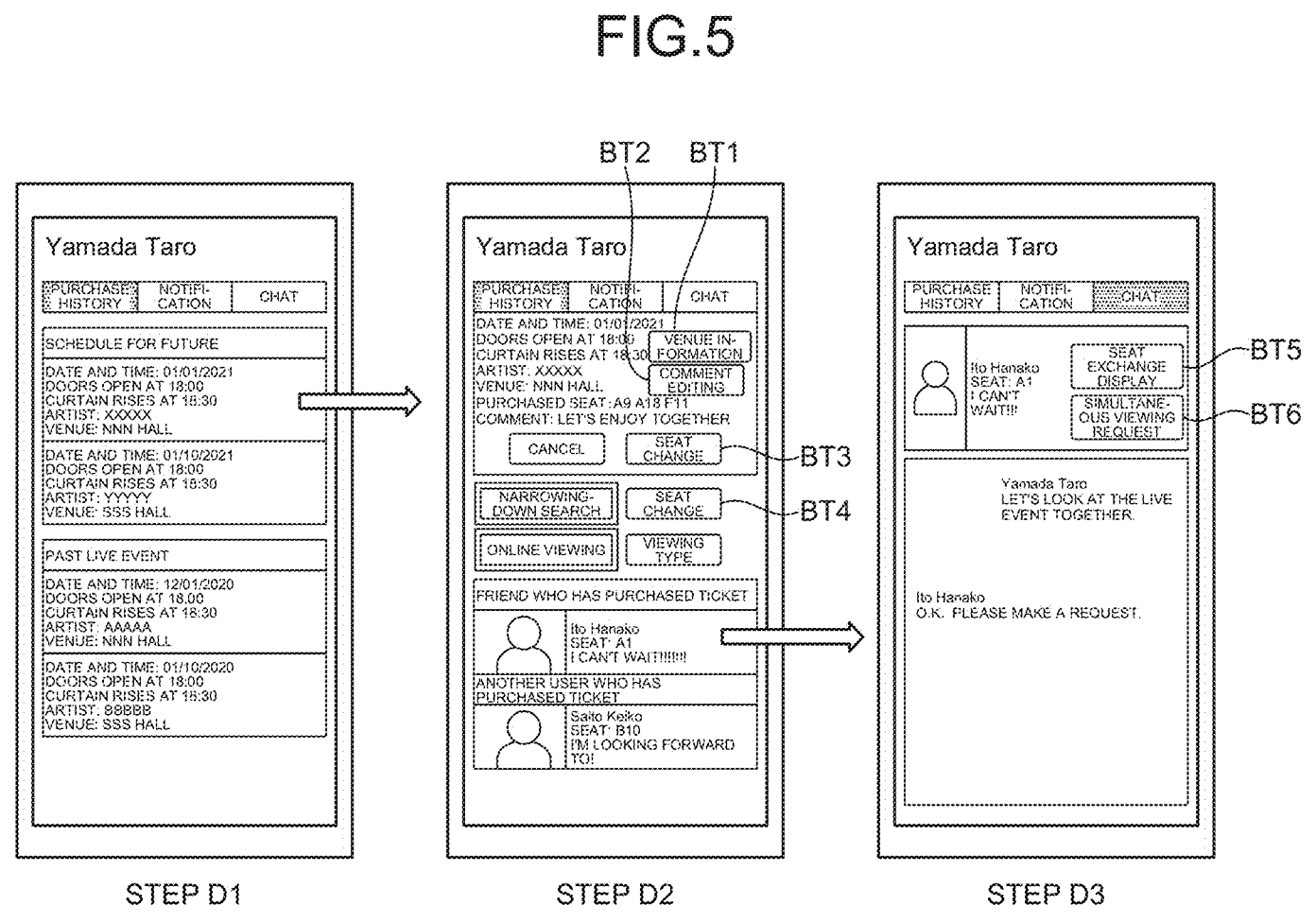

FIG. 5 is an explanatory diagram of a simultaneous viewing request using chat.

The user US checks the participation status and the seat position of the friend FD by using a method similar to STEPS C1 to C2 in FIG. 4 (STEPS D1 to D2). When the user US desires to enjoy a talk with the friend FD during the live event, the user US requests the friend FD to perform simultaneous viewing by using the chat function. For example, the user US taps the comment of the friend FD to activate the chat function, and writes a request message for simultaneous viewing in a reply field of the comment. When the friend FD agrees to the request, the user US makes a request for simultaneous viewing of the user US and the friend FD by using a "simultaneous viewing request" button BT6 (STEP D3).

6. Experience Example of Online Live Viewing

Figure 6:
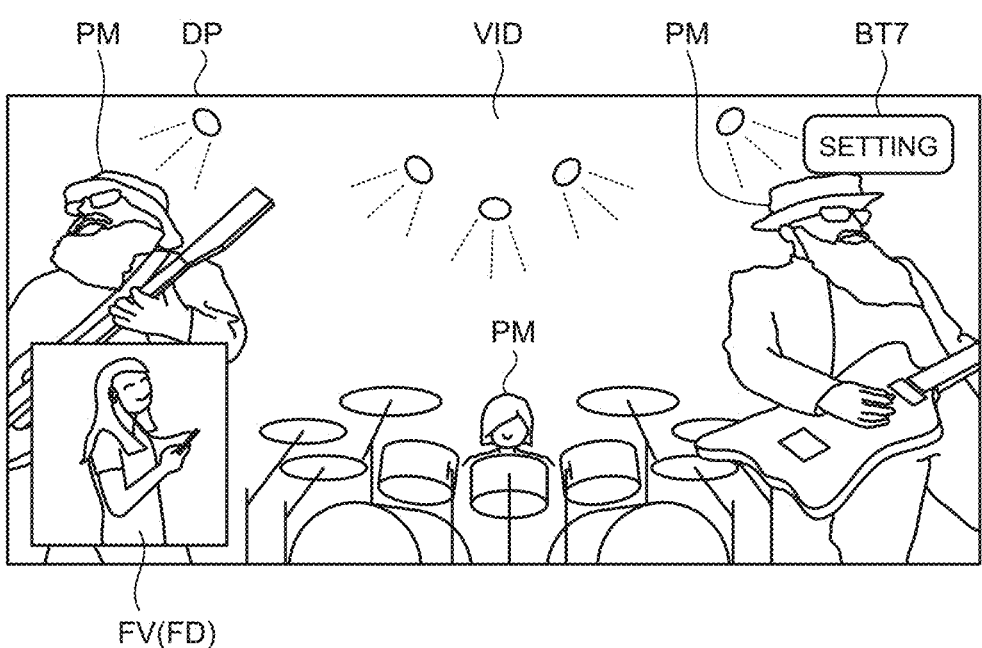
FIG. 6 illustrates an experience example of online live viewing.
Figure 7:
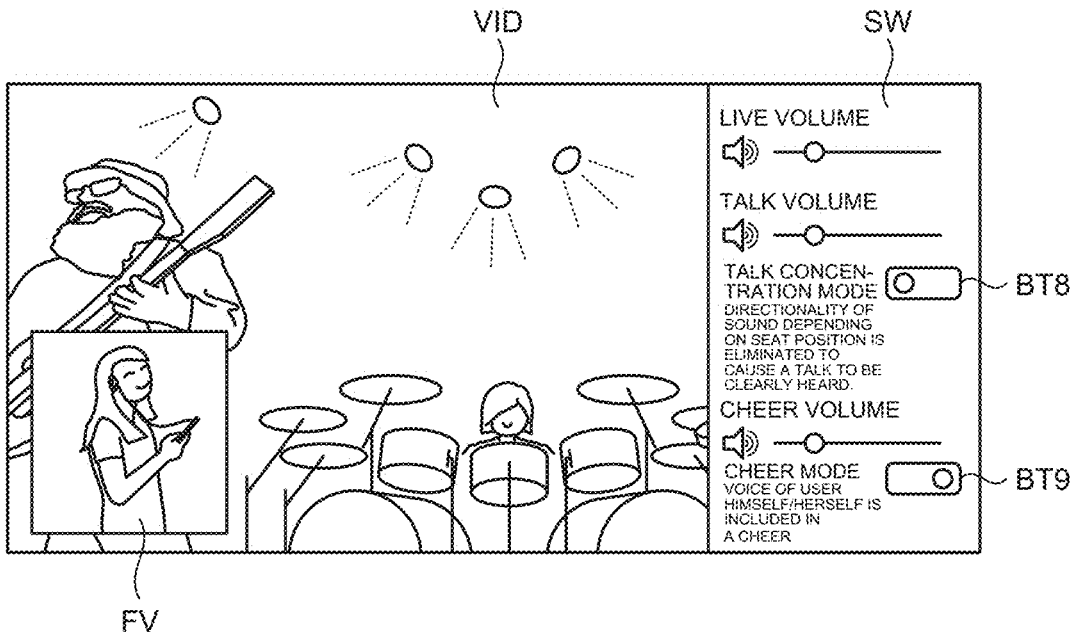
FIG. 7 illustrates the experience example of the online live viewing.

FIGS. 6 and 7 illustrate an experience example of online live viewing.

The ticket purchaser TP views a video and sound of a live venue by using the terminal TM. In the venue CV, a plurality of cameras is installed so as to surround the stage. The server SV generates a video of a viewpoint (viewpoint video) corresponding to the seat position of the ticket purchaser TP from videos captured by a plurality of cameras by using free viewpoint video technology and the like. The server SV transmits the generated viewpoint video to the terminal TM of the ticket purchaser TP as a live video VID.

When the terminal TM is a head mounted terminal such as a head mounted display (HMD), the server SV may generate the live video VID that changes following the movement of a head (change in viewpoint). The server SV can determine whether or not to change the live video VID following the movement of a head based on user input information transmitted from the terminal TM.

The server SV acquires the live sound data LS from the venue CV. The server SV acquires cheer data and talk data from the terminal TM of each ticket purchaser TP. The server SV specifies individual sound sources included in sound. In the example of FIG. 6, the performer PM who plays a performance and a talk, the friend FD who has a talk, and the audience AU who cheers are sound sources. The server SV associates the position of a sound source with sound for each sound source that generates a sound field.

The server SV calculates the positional relation between the purchased seat ST and the sound source for each sound source. The server SV generates sound data for stereoscopically reproducing a sound field generated by a sound source based on the calculated positional relation. This causes stereoscopic acoustic data of each sound source to be generated. The stereoscopic acoustic data is sound data for stereoscopically reproducing sound of a sound source in the purchased seat ST. The server SV transmits the stereoscopic acoustic data of each sound source to the terminal TM of the ticket purchaser TP together with a live video LV as the distribution data SF. This causes the server SV to reproduce a sound field generated in the purchased seat ST of the ticket purchaser TP.

The reproduced sound field includes a sound field of sound heard from the stage, a sound field of a talk heard from the friend seat, and a sound field of a cheer. In the example of FIG. 6, the performer PM plays a performance on the stage. Sound heard from the stage includes a musical piece and stage banter (chatting of performer PM given between musical pieces). The cheer includes a talk with the performer PM during stage banter.

The terminal TM reproduces the live video LV and sound transmitted from the server SV. When there is the friend FD for whom a simultaneous viewing request has been made, a thumbnail FV of the friend FD is displayed on the touch panel DP together with the live video LV. The display position of the thumbnail FV is determined based on the positional relation with the friend seat. For example, when the friend seat is on the left side of the seat of the ticket purchaser TP himself/herself, the thumbnail FV is displayed at the lower left of the touch panel DP. When the friend seat is on the right side of the seat of the ticket purchaser TP himself/herself, the thumbnail FV is displayed at the lower right of the touch panel DP.

The user US can display a "setting" button BT7 by tapping the upper right of the touch panel DP. When the "setting" button BT7 is tapped, a setting window SW as illustrated in FIG. 7 is displayed on the right side of the touch panel DP. In the setting window SW, a user interface (UI) for independently adjusting the volumes of individual sound sources is displayed. In the example of FIG. 7, a UI for adjusting the volume of a live performance, the volume of a talk with the friend FD, and the volume of cheer is displayed. The server SV independently adjusts the volumes of individual sound sources included in a sound field based on user input information input by using the setting window SW.

In the adjustment window SW, a switch BT8 and a switch BT9 are also displayed. The switch BT8 is used for switching a talk concentration mode. The switch BT9 is used for switching a cheer mode. In the talk concentration mode, the directionality of sound caused by the positional relation between the seat of the ticket purchaser TP himself/herself and the friend seat is eliminated. When the talk concentration mode is turned on, sound of a talk is easily heard. In the cheer mode, sound distribution of voice of the user US of the terminal TM as cheer is approved. When the cheer mode is turned on, voice of the user US is reproduced as a cheer together with the voice of the other audience AU.

7. Virtual Cheer System

Figure 8:
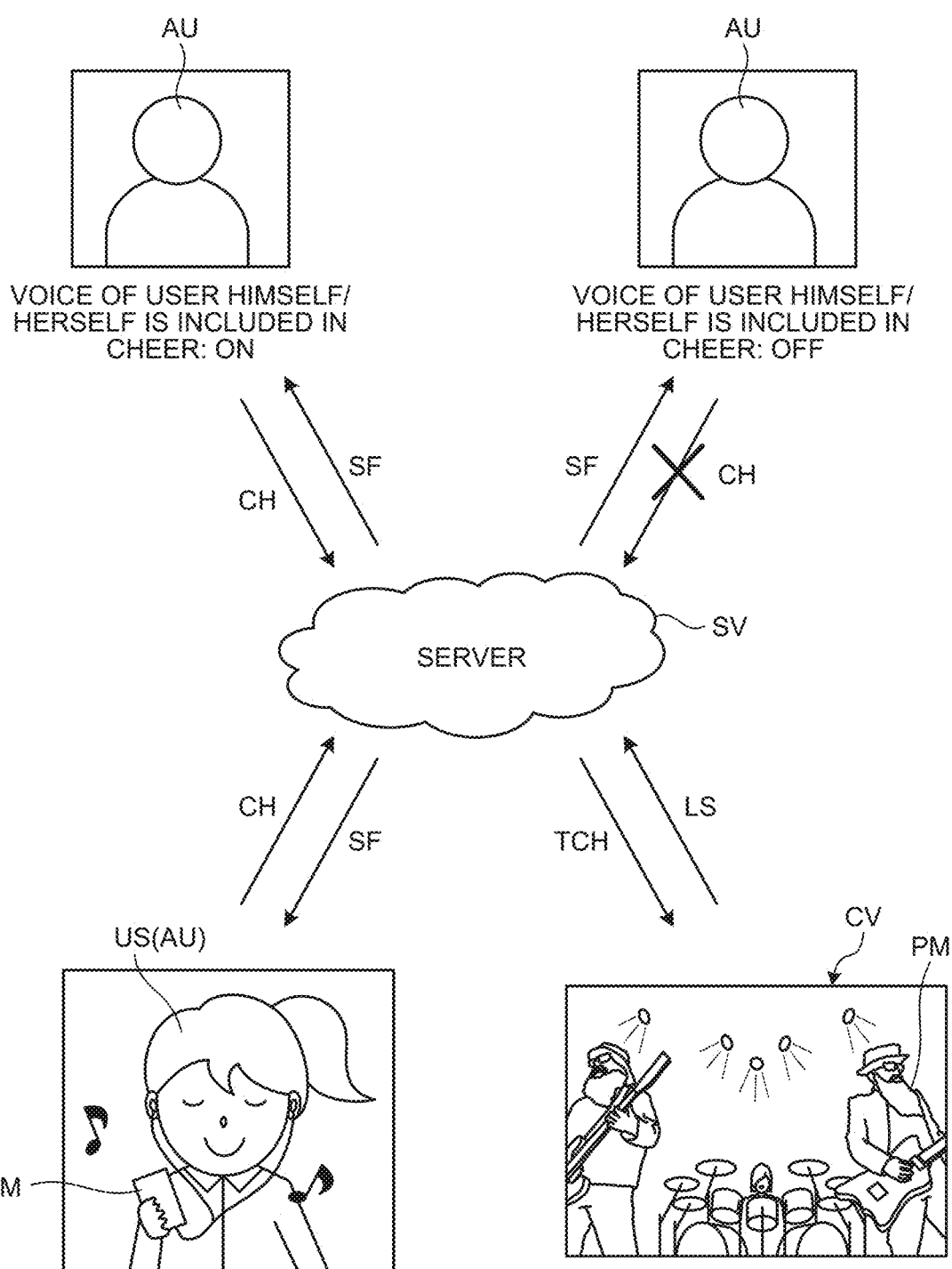
FIG. 8 illustrates one example of a virtual cheer system.

FIG. 8 illustrates one example of a virtual cheer system.

The distribution data SF includes the cheer data CH of each member of the audience AU. A member of the audience AU can select whether or not to distribute sound of the member himself/herself as a cheer by switching the cheer mode. Therefore, a cheer viewed via the terminal TM selectively includes cheers of one or more members of the audience AU who have approved sound distribution (who have turned cheer mode on) among all the members of the audience AU who have purchased tickets.

The server SV acquires the cheer data CH as data associated with the seat position. The server SV synthesizes the cheer data CH of all the members of the audience AU who have approved sound distribution based on the seat position of each member of the audience AU. This causes sound data capable of stereoscopically reproducing a cheer having directionality in accordance with the seat position at any position to be generated.

For example, the server SV synthesizes the cheer data CH of all the members of the audience AU who have approved sound distribution based on the positional relation between the purchased seat ST of each member of the audience AU and the purchased seat ST of the user US. This causes the server SV to generate sound data capable of stereoscopically reproducing a sound field of a cheer generated in the purchased seat ST of the user US. The server SV transmits the generated sound data indicating a cheer while causing the sound data to be included in the distribution data SF of the user US.

The server SV synthesizes the cheer data CH of all the members of the audience AU who have approved sound distribution based on the positional relation between the purchased seat ST of each member of the audience AU and the stage. This causes the server SV to generate sound data (total cheer data TCH) capable of stereoscopically reproducing a sound field of a cheer generated in the stage. The server SV transmits the generated total cheer data TCH to a speaker of the venue CV. The performer PM plays a performance while listening to the cheers of the audience AU. Since voice of the audience AU is heard, the performer PM can communicate with the audience AU during stage banter.

The server SV can remove inappropriate utterances included in cheers by using a sound recognition method as described in WO 2018/088319 A. In this case, the server SV can warn a speaker who has given an inappropriate utterance. When the same speaker gives an inappropriate utterance a number of times exceeding an accepted standard (e.g., three times), the server SV can eject the speaker (eliminate voice).

When detecting an inappropriate utterance, the server SV can distribute a past similar cheer instead of the cheer acquired in a live event. The distributed cheer is a past cheer that is similar to the cheer acquired in the live event and that does not include an inappropriate utterance. The server SV stores data of a cheer in a past live event. The server SV extracts a cheer similar to a currently acquired cheer from data of a cheer in the past by using artificial intelligence (AI).

8. Remote Virtual Live System

Figure 9:
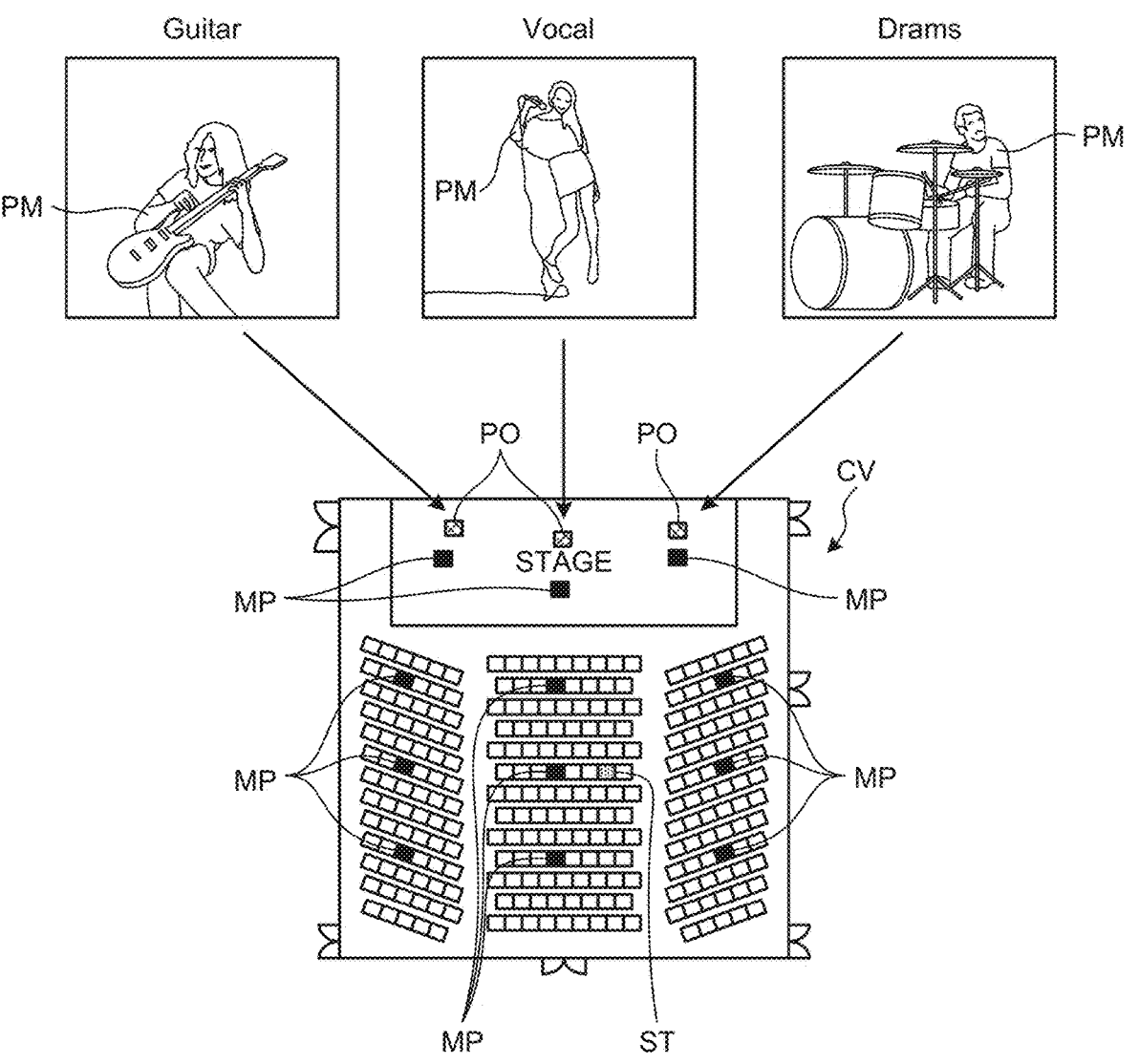
FIG. 9 illustrates one example of a remote virtual live system.

FIG. 9 illustrates one example of a remote virtual live system.

In the example of FIG. 8, a video and sound of a performance played in the venue CV of the event are distributed to the terminal TM. In the example of FIG. 9, performances are played at places different from the venue CV of the event. The performers PM also play a performance at distant places. Videos and sounds of the performances of individual performers PM are synthesized and distributed to the terminal TM.

Positions PO of individual performers PM on stages are predetermined. The server SV generates stereoscopic acoustic data of a performance of a performer PM for each performer PM based on the positional relation between the seat of the ticket purchaser TP and the individual performers PM (sound sources). The server SV synthesizes stereoscopic acoustic data of each performer PM, and transmits the stereoscopic acoustic data to the terminal TM of the ticket purchaser TP. This causes the server SV to reproduce a sound field generated in the purchased seat ST of the ticket purchaser TP.

The server SV reproduces a sound field generated in the purchased seat ST based on acoustic characteristics (reverberation time, support (ST), and echo time pattern) of the venue CV, a position PO of the performer PM, and the position of the purchased seat ST. The operator of the venue CV preliminarily measures the acoustic characteristics of the venue CV.

For example, the server SV acquires the acoustic characteristics of a plurality of measurement points MP set in the venue CV as the acoustic characteristics of the venue CV. The server SV corrects performer data of the performer PM acquired at another place based on the acoustic characteristics of a measurement point MP closest to the position PO of the performer PM on the stage. The server SV uses the corrected performance data as sound data of the performer PM. The server SV generates stereoscopic acoustic data for stereoscopically reproducing the corrected performance data at the seat position by using the acoustic characteristics of the measurement point MP closest to the seat position of the ticket purchaser TP.

In the example of FIG. 9, the venue CV is not required to actually exist. The distribution data SF may be generated based on a background video and the acoustic characteristics of the virtual venue CV designed by the operator.

9. Hardware Configuration Example

Figure 10:
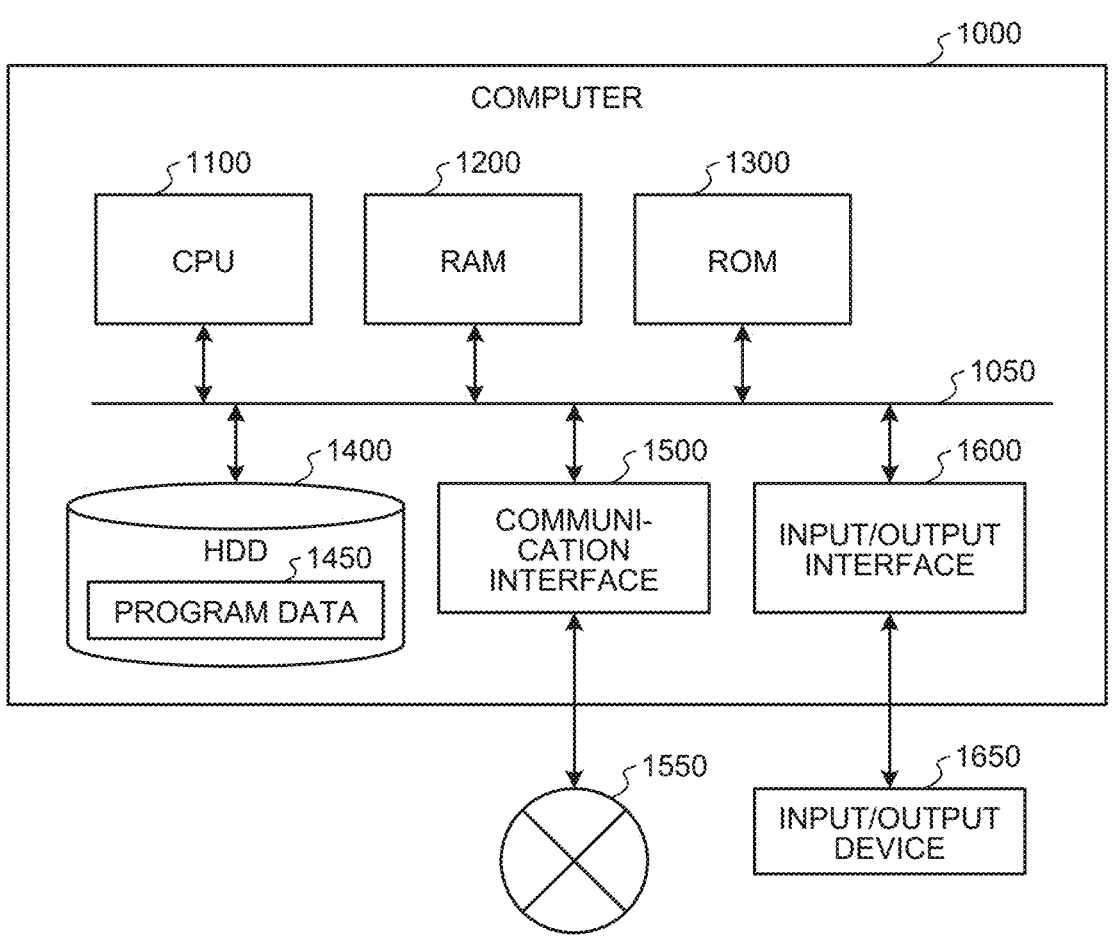
FIG. 10 illustrates a hardware configuration example of a server.

FIG. 10 illustrates a hardware configuration example of the server SV.

The server SV functions as an information processing apparatus that processes various pieces of information. The server SV is implemented by a computer 1000 as illustrated in FIG. 10. The computer 1000 includes a CPU 1100, a RAM 1200, a read only memory (ROM) 1300, a hard disk drive (HDD) 1400, a communication interface 1500, and an input/output interface 1600. Units of the computer 1000 are connected by a bus 1050.

The CPU 1100 operates based on a program stored in the ROM 1300 or the HDD 1400, and controls each unit. For example, the CPU 1100 develops the program stored in the ROM 1300 or the HDD 1400 on the RAM 1200, and executes processing corresponding to various programs. The CPU 1100 can form the processor PR.

The ROM 1300 stores a boot program such as a basic input output system (BIOS) executed by the CPU 1100 at the time when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure. The information processing program is one example of program data 1450.

The communication interface 1500 is used for connecting the computer 1000 to an external network 1550 (e.g., Internet). For example, the CPU 1100 receives data from another device and transmits data generated by the CPU 1100 to another device via the communication interface 1500.

The input/output interface 1600 connects an input/output device 1650 with the computer 1000. For example, the CPU 1100 receives data from an input device such as a keyboard and a mouse via the input/output interface 1600. Furthermore, the CPU 1100 transmits data to an output device such as a display, a speaker, and a printer via the input/output interface 1600. Furthermore, the input/output interface 1600 may function as a medium interface that reads a program and the like recorded in a predetermined recording medium (medium). The medium includes, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, and the like.

The CPU 1100 implements various functions of the computer 1000 by executing a program loaded on the RAM 1200. Furthermore, the HDD 1400 stores a program for causing the computer 1000 to function as the server SV. Note that the CPU 1100 reads the program data 1450 from the HDD 1400 and executes the program data 1450. In another example, the CPU 1100 may acquire these programs from another apparatus via the external network 1550.

10. Effects

The server SV includes the processor PR. The processor PR reproduces a sound field generated in the purchased seat ST of the ticket purchaser TP. For example, the processor PR calculates the positional relation between the purchased seat ST and a sound source for each sound source that generates a sound field. The processor PR generates sound data for stereoscopically reproducing a sound field generated by a sound source based on the calculated positional relation. In an information processing method of the present disclosure, a computer executes processing of the server SV. A program of the present disclosure causes a computer to implement the processing of the server SV.

According to this configuration, it is possible to obtain realistic feeling as if viewing is actually performed at a seat for which a ticket has been reserved.

The sound field includes a sound field of sound heard from the stage, a sound field of a talk heard from a friend seat, and a sound field of a cheer. For example, the processor PR generates sound data for stereoscopically reproducing a sound field of sound heard from the stage based on the positional relation between the purchased seat ST and the stage. The processor PR generates sound data for stereoscopically reproducing a sound field of a talk heard from the friend seat based on the positional relation between the purchased seat ST and the friend seat. The processor PR generates sound data for stereoscopically reproducing a sound field of a cheer heard from each audience seat based on the positional relation between the purchased seat ST and each audience seat.

According to this configuration, it is possible to obtain realistic feeling as if a user is listening to sound of the stage at his/her seat. Furthermore, it is possible to obtain realistic feeling as if there is a talk between a user seat and a friend seat and other members of audience surround the user.

The cheer selectively includes cheers of one or more members of the audience AU who have approved sound distribution among all the members of the audience AU who have purchased tickets.

According to this configuration, privacy of members of the audience AU who have not approved sound distribution is protected.

The processor PR removes an inappropriate utterance included in the cheer.

According to this configuration, content including no inappropriate utterance can be distributed.

The processor PR warns a speaker who has made an inappropriate utterance.

According to this configuration, recognition of an inappropriate utterance of the speaker is promoted.

The cheer is a past cheer that is similar to the cheer acquired in a live event and that does not include an inappropriate utterance.

According to this configuration, content including no inappropriate utterance can be distributed.

The processor PR reproduces a sound field based on the acoustic characteristics of the venue CV, the position of the performer PM, and the position of the purchased seat ST.

According to this configuration, a sound field to be viewed at a seat position is realistically reproduced.

The processor PR independently adjusts the volumes of individual sound sources included in a sound field based on user input information.

According to this configuration, sound of a sound source that the user US desires to view (such as talk with friend FD) can be clearly reproduced.

Note that the effects described in the present specification are merely examples and not limitations. Other effects may be obtained.

Appendix

Note that the present technology can also have the configurations as follows.

(1)

An information processing apparatus comprising a processor that reproduces a sound field generated in a purchased seat of a ticket purchaser.

(2)

The information processing apparatus according to (1), wherein the processor calculates positional relation between the purchased seat and a sound source for each sound source that generates the sound field, and generates sound data for stereoscopically reproducing a sound field generated by the sound source based on the positional relation.

(3)

The information processing apparatus according to (1) or (2), wherein the sound field includes a sound field of sound heard from a stage.

(4)

The information processing apparatus according to (3), wherein the processor generates sound data for stereoscopically reproducing a sound field of sound heard from the stage based on positional relation between the purchased seat and the stage.

(5)

The information processing apparatus according to any one of (1) to (4), wherein the sound field includes a sound field of a talk heard from a friend seat.

(6)

The information processing apparatus according to (5), wherein the processor generates sound data for stereoscopically reproducing a sound field of the talk heard from the friend seat based on positional relation between the purchased seat and the friend seat.

(7)

The information processing apparatus according to any one of (1) to (6), wherein the sound field includes a sound field of a cheer.

(8)

The information processing apparatus according to (7), wherein the processor generates sound data for stereoscopically reproducing a sound field of a cheer heard from each audience seat based on positional relation between the purchased seat and each audience seat.

(9)

The information processing apparatus according to (7) or (8), wherein the cheer selectively includes a cheer of one or more members of audience who have approved sound distribution among all members of the audience who have purchased tickets.

(10)

The information processing apparatus according to any one of (7) to (9), wherein the processor removes an inappropriate utterance included in the cheer.

(11)

The information processing apparatus according to (10), wherein the processor warns a speaker who has given the inappropriate utterance.

(12)

The information processing apparatus according to (7), wherein the cheer is a past cheer that is similar to a cheer acquired in a live event and that does not include an inappropriate utterance.

(13)

The information processing apparatus according to any one of (1) to (12), wherein the processor reproduces the sound field based on an acoustic characteristic of a venue, a position of a performer, and a position of the purchased seat.

(14)

The information processing apparatus according to any one of (1) to (13), wherein the processor independently adjusts volumes of individual sound sources included in the sound field based on user input information.

(15)

An information processing method to be executed by a computer, comprising reproducing a sound field generated in a purchased seat of a ticket purchaser.

(16)

A program causing a computer to achieve reproducing a sound field generated in a purchased seat of a ticket purchaser.

REFERENCE SIGNS LIST

AU AUDIENCE
CV VENUE
PM PERFORMER
PR PROCESSOR
ST PURCHASED SEAT
SV SERVER (INFORMATION PROCESSING APPA-
    RATUS)
TP TICKET PURCHASER

The invention claimed is:

1. An information processing apparatus comprising:
circuitry configured to
    reproduce a sound field generated in a purchased seat of
        a ticket purchaser;
    calculate a positional relation between the purchased
        seat and a sound source for each sound source that
        generates the sound field; and
    generate sound data for stereoscopically reproducing a
        sound field generated by the sound source based on
        the positional relation.

2. The information processing apparatus according to claim 1,
    wherein the sound field includes a sound field of sound
        heard from a stage.

3. The information processing apparatus according to claim 2,
    wherein the circuitry generates sound data for stereoscopically reproducing a sound field of sound heard
        from the stage based on positional relation between the
        purchased seat and the stage.

4. The information processing apparatus according to claim 1,
    wherein the sound field includes a sound field of a talk
        heard from a friend seat.

5. The information processing apparatus according to claim 4,
    wherein the circuitry generates sound data for stereoscopically reproducing a sound field of the talk heard
        from the friend seat based on positional relation
        between the purchased seat and the friend seat.

6. The information processing apparatus according to claim 1,
  wherein the sound field includes a sound field of a cheer.
7. The information processing apparatus according to claim 6,
  wherein the circuitry generates sound data for stereoscopically reproducing a sound field of a cheer heard from each audience seat based on positional relation between the purchased seat and each audience seat.
8. The information processing apparatus according to claim 6,
  wherein the cheer selectively includes a cheer of one or more members of audience who have approved sound distribution among all members of the audience who have purchased tickets.
9. The information processing apparatus according to claim 6,
  wherein the circuitry removes an inappropriate utterance included in the cheer.
10. The information processing apparatus according to claim 9,
  wherein the circuitry warns a speaker who has given the inappropriate utterance.
11. The information processing apparatus according to claim 6,
  wherein the cheer is a past cheer that is similar to a cheer acquired in a live event and that does not include an inappropriate utterance.
12. The information processing apparatus according to claim 1,
  wherein the circuitry reproduces the sound field based on an acoustic characteristic of a venue, a position of a performer, and a position of the purchased seat.
13. The information processing apparatus according to claim 1,
  wherein the circuitry independently adjusts volumes of individual sound sources included in the sound field based on user input information.
14. An information processing method to be executed by a computer, comprising:
  reproducing a sound field generated in a purchased seat of a ticket purchaser;
  calculating a positional relation between the purchased seat and a sound source for each sound source that generates the sound field; and

generating sound data for stereoscopically reproducing a sound field generated by the sound source based on the positional relation.
15. A non-transitory computer-readable medium storing a program that, when executed by circuitry, causes the circuitry to:
  reproduce a sound field generated in a purchased seat of a ticket purchaser;
  calculate a positional relation between the purchased seat and a sound source for each sound source that generates the sound field; and
  generate sound data for stereoscopically reproducing a sound field generated by the sound source based on the positional relation.
16. The information processing apparatus according to claim 6,
  wherein the circuitry synthesizes cheer data of all members of the audience who have approved sound distribution based on the positional relation between the purchased seat of each member of the audience and the purchased seat of the ticket purchaser, thereby generating sound data for stereoscopically reproducing a sound field of the cheer.
17. The information processing apparatus according to claim 16,
  wherein the circuitry removes an inappropriate utterance included in the cheer before synthesizing the cheer data.
18. The information processing apparatus according to claim 17,
  wherein the circuitry warns a speaker who has given the inappropriate utterance and, when the same speaker gives an inappropriate utterance a number of times exceeding an accepted standard, eliminates voice of the speaker.
19. The information processing apparatus according to claim 16,
  wherein, when detecting an inappropriate utterance, the circuitry distributes a past cheer that is similar to the cheer acquired in the live event and that does not include an inappropriate utterance, the past cheer being extracted from data of cheers in past live events using artificial intelligence.

* * * * *